Figure 1:
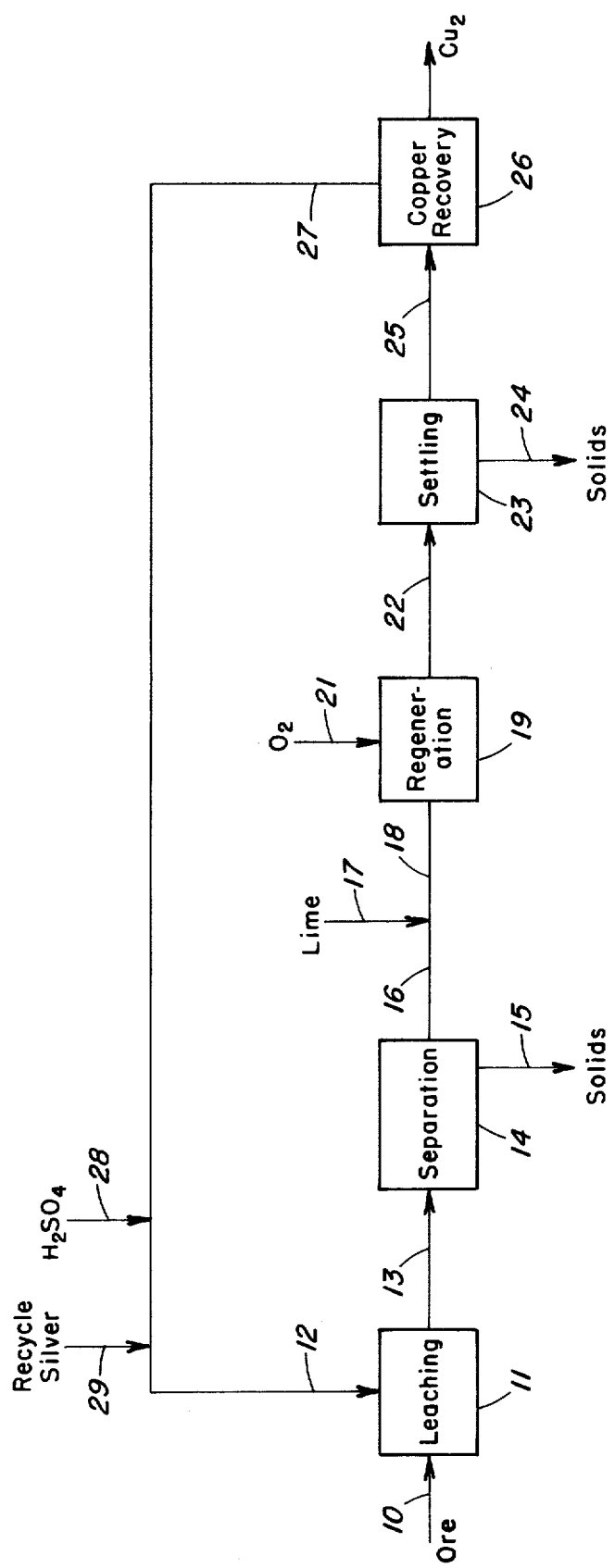

United States Patent [19]

Snell

[11] 3,886,257

[45] May 27, 1975

[54] SULFATE LEACHING OF COPPER ORES USING SILVER CATALYST

[75] Inventor: George J. Snell, Fords, N.J.

[73] Assignee: The Lummus Company, Bloomfield, N.J.

[22] Filed: Nov. 29, 1972

[21] Appl. No.: 310,230

[52] U.S. Cl. .................. 423/27; 423/34; 423/41; 75/101 R; 75/104; 75/115; 75/117
[51] Int. Cl. .................. C01g 3/10; C22b 15/08
[58] Field of Search ............ 75/115, 118, 117, 104; 423/27, 41

[56] References Cited
UNITED STATES PATENTS

| | | | |
|---|---|---|---|
| 2,563,623 | 8/1951 | Scott | 75/117 X |
| 2,878,102 | 3/1959 | Sternfels | 423/41 X |
| 3,637,371 | 1/1972 | Mackiw et al. | 423/41 X |

OTHER PUBLICATIONS

"Metallurgy of Copper," H. O. Hofman, 2nd ed. 1924, pp. 64–65.

Primary Examiner—Oscar R. Vertiz
Assistant Examiner—Brian E. Hearn
Attorney, Agent, or Firm—Marn & Jangarathis

[57] ABSTRACT

Copper is oxidatively leached from a copper bearing ore in the presence of a catalytic amount of silver ions to decrease leaching times. The oxidative agent may be ferric sulfate, dilute sulfuric acid in the presence of added oxygen, or concentrated sulfuric acid.

22 Claims, 2 Drawing Figures

SULFATE LEACHING OF COPPER ORES USING SILVER CATALYST

This invention relates to the recovery of copper, and more particularly, to a new and improved process for the oxidative leaching of copper ores.

Copper may be recovered from ores by extraction involving leaching of the copper values under oxidizing conditions. Thus, for example, copper may be leached from ores by use of sulfuric acid to solubilize the copper as copper sulfate. The known processes for such oxidative leaching, however, have numerous disadvantages. Thus, such processes require prolonged leaching periods to produce acceptable copper extractions. In addition, copper recovery from ores such as chalcopyrite is generally low. Accordingly, there is a need for improved processes for oxidatively leaching copper values from ores.

An object of the present invention is to provide for improved recovery of copper from ores.

Another object of the present invention is to provide for improved recovery of copper by oxidative leaching.

A further object of the present invention is to provide for oxidative leaching of copper in shorter times than heretofore possible.

The objects of the present invention are broadly accomplished, in one aspect, by oxidatively leaching a copper ore in the presence of a catalytic amount of silver to increase the leaching rate.

More particularly, copper ores are leached with either aqueous ferric sulfate; or a combination of aqueous sulfuric acid and oxygen; or concentrated sulfuric acid, as the oxidative leaching agent, in the presence of silver dissolved in the leaching medium. The silver is generally added to the leaching solution to initially provide silver in an amount from about 25 to about 10,000 ppm, and preferably an amount from about 50 to about 500 ppm of soluble silver, calculated as elemental silver. It is to be understood, however, that greater amounts have no beneficial effect. The silver is added in a form which is at least initially soluble in the leaching medium; e.g., the silver values are soluble at the initiation of leaching, but, during leaching, all, some or none of the soluble silver may precipitate from the solution. The oxidative leaching medium, as hereinabove described, may be an aqueous medium or may be a sulfuric acid medium (dilute or concentrated), and the silver is added in a form which is at least initially soluble in the leaching medium. The silver may be added to the leaching medium either as metallic silver or as a silver compound, such as, silver nitrate, silver oxide, silver sulfate, silver fluoroborate, and the like. The use of a suitable form of silver to provide an initial catalytic amount of silver dissolved in the leaching medium is deemed to be within the scope of those skilled in the art from the teachings herein. It is to be understood that the term "silver" as hereinafter employed with respect to the catalyst which is at least initially soluble in the leaching solution generically includes the use of both metallic silver and silver compounds as the source of soluble silver.

The copper bearing ores (the term "ore" as used herein includes ore concentrates) may be any one of the wide variety of copper bearing ores including complex mineral sulfides composed of copper, sulfur and iron in varying proportions, such as chalcopyrite ($CuFeS_2$) and bornite ($CuFeS_4$) and copper sulfide ores such as chalcocite ($Cu_2S$) and covellite ($CuS$). The ores or concentrates are prepared, as known in the art, prior to the oxidative leaching. In general, a concentrate of the ore is prepared by flotation and the concentrate pulverized; e.g., to 100% minus 150 mesh. The preparation of the ore, prior to the leaching, forms no part of the present invention, and no further details in this respect are required for a full understanding of the present invention.

The copper bearing ore may be oxidatively leached, as hereinabove noted, by using ferric sulfate, either in the presence or absence of sulfuric acid, or in the presence or absence of oxygen, and preferably in the presence of dilute sulfuric acid, and in the presence of a catalytic amount of silver which is at least initially soluble in the leaching medium. As a result of the leaching, copper and iron, if present are extracted into the liquid phase in the form of sulfates and by-product elemental sulfur is deposited in the solid phase. The leaching, using chalcopyrite as a representative ore may be represented by the following equation:

$$CuFeS_2 + 2Fe_2(SO_4)_3 \rightarrow CuSO_4 + 5FeSO_4 + 2S$$

The quantity of ferric sulfate which is provided in the leaching depends on the amount of copper desired in the final leach solution. The ferric sulfate is added in a quantity sufficient to combine with copper values of the ore, present as sulfides, to convert same to sulfates in an amount which provides the desired concentration of dissolved copper in the final leach solution. In general, the aqueous leach solution contains from about 2 to about 40 wt. % ferric sulfate (preferably 10–40 wt. %), and sulfuric acid in an amount from about 0 to about 20 wt. % and preferably from about 1.0 to about 5.0 wt. %. The leaching solution may also include some cupric sulfate in that complete recovery of copper values from the pregnant solution resulting from the leaching is not possible in all cases. In addition, the leaching solution includes, as hereinabove noted, a catalytic amount of silver which is at least initially soluble in the leaching solution. The ore and leaching solution are generally combined in an amount to provide a pulp density (pounds of ore per pound of total solution) from about 1 to about 40%, and preferably from about 5 to about 25%, in the leaching solution.

The leaching is generally effected at temperatures from about 150°F. to about 235°F., preferably temperatures from about 180°F. to about 225°F., and at pressures from about 0 to about 3,000 psig., and preferably from about 0 to about 300 psig.

The suspended solids are separated from the leaching effluent, and the copper is recovered from the leaching solution by conventional techniques; e.g., extraction and electrowinning.

In accordance with a preferred embodiment of the present invention, the leaching solution, subsequent to the leaching step, is oxidized to convert ferrous sulfate to ferric sulfate, whereby the leaching solution may be continuously regenerated.

Similarly, the copper bearing ore may be oxidatively leached, as hereinabove noted, using a dilute aqueous sulfuric acid leach liquor in conjunction with oxygen to extract copper into the liquid phase as copper sulfate. The leaching, using chalcopyrite as a representative ore may be represented by the following equation:

$$CuFeS_2 + H_2SO_4 + 1\tfrac{1}{4}O_2 + \tfrac{1}{2}H_2O \rightarrow CuSO_4 + Fe(OH)_3 + 2S$$

The quantity of sulfuric acid which is provided in the leaching depends on the amount of copper desired in the final leach solution. The sulfuric acid is added in a quantity sufficient to combine with copper values of the ore, present as sulfides, to convert same to sulfates in an amount which provides the desired concentration of dissolved copper in the final leach solution. In general, the aqueous sulfuric acid leach solution contains from about 0.5 to about 5.0% and preferably from about 0.5 to about 2.0%, all by weight, of sulfuric acid and a catalytic amount of silver, initially soluble in the leaching solution. The leaching solution may also include some cupric sulfate in that complete recovery of copper values from the pregnant solution produced in the leaching is not possible in all cases. The leaching solution may also include a buffering agent, such as, for example, ammonium sulfate, to aid in the prevention of solubilization of iron values, if any, in the ore.

The leaching operation is generally effected at a temperature from about 150°F. to about 235°F. preferably from about 180°F. to about 225°F. and at oxygen partial pressures from about 100 to about 500 psig, preferably from about 200 to about 500 psig. The ore and leaching solution are generally combined in an amount to provide a pulp density from about 5 to about 40%, and preferably from about 15 to about 30%. In addition, if desired, in order to prevent solubilization of iron values at the end of the leaching, the acidity of the leaching solution is controlled (by use of a suitable buffering agent such as ammonium sulfate) in order to selectively leach copper values from the ore. In general, the pH should be from about 1.0 to about 5.0, and preferably from about 1.5 to about 3.0.

The copper bearing ore may also be oxidatively leached by the use of concentrated sulfuric acid; the leach solution contains at least 90% sulfuric acid.

The leaching with sulfuric acid, using chalcopyrite as a representative ore, may be represented by the following equation:

$$CuFeS_2 + 4H_2SO_4 \rightarrow CuSO_4 + FeSO_4 + 2S° + 2SO_2 + H_2O$$

The leach solution, as hereinabove noted, contains at least 90%, by weight, sulfuric acid, and also includes, as hereinabove described, a catalytic amount of silver which is at least initially soluble in the leach solution.

The leaching is generally effected at temperatures from about 150°F. to about 235°F., preferably from about 180°F. to about 225°F., and at pressures from about 0 to about 3,000 psig, and preferably from about 0 to about 300 psig. The ore and leaching solution are generally combined in an amount to provide a pulp density from about 5 to about 75%, and preferably from about 10 to about 40%.

The present invention will be further described with respect to preferred embodiments thereof illustrated in the accompanying drawings, but it is to be understood that the scope of the invention is not to be limited thereby.

Figure 2:
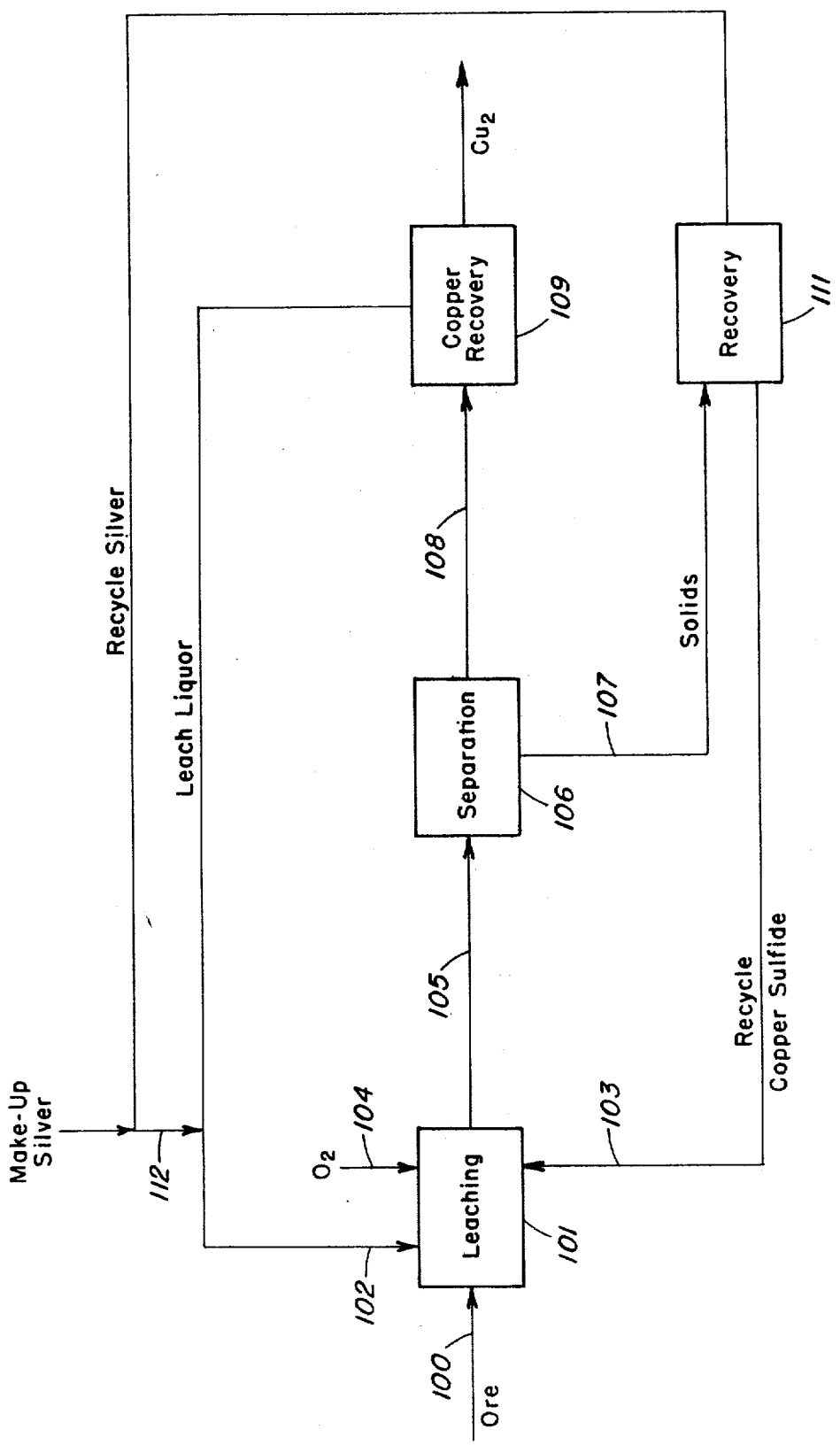

These and other objects of the present invention should be more readily apparent from reading the following detailed description thereof with reference to the accompanying drawings wherein:

FIG. 1 is a simplified schematic flow diagram of one embodiment of the present invention; and FIG. 2 is a simplified schematic flow diagram of another embodiment of the present invention.

Referring to FIG. 1 of the drawings, a finely divided (100% — 150 mesh) copper bearing ore concentrate, such as chalcopyrite, in line 10 is introduced into a leaching zone 11 along with a leaching solution in line 12, comprised of an aqueous solution of ferric sulfate, and dilute sulfuric acid and an initial catalytic amount of silver, as hereinabove described, dissolved in the leaching solution. The leaching solution may be free of sulfuric acid, but as hereinafter noted, the presence of sulfuric acid is preferred in that the presence thereof is required for regeneration of ferric sulfate, and in addition, the sulfuric acid retards excessive hydrolysis of ferric sulfate. The leaching may also be effected in the presence of added oxygen to help maintain the iron in its higher valence state. The leaching zone 11, as known in the art, may be comprised of a battery of stirred tanks arrayed for either continuous or batch operation. The leaching zone 11 is operated at the conditions hereinabove described and as a result of the contact between the leaching solution and copper ore, copper and iron values are extracted into the liquid phase as sulfates, and by-product elemental sulfur is deposited in the solid phase.

An effluent slurry, comprised of the pregnant leaching solution and solids, is withdrawn from leaching zone 11 through line 13 and introduced into a liquid-solid separation zone, of a type known in the art, designated as 14 to separate suspended solids, as known in the art, which are withdrawn through line 15.

The solids may contain some precipitated silver values from the silver catalyst. The silver values may be recovered from the solids by a conventional technique such as cyanide leaching or pyrometallurgical extraction using liquid lead or copper under furnace conditions. The recovered silver values may be recycled to the leaching operation.

The solids free pregnant solution is withdrawn from liquid-solid separation zone 14 through line 16 and the pH thereof is adjusted by a suitable base, such as lime, in line 17. The amount of iron which is separated from the pregnant solution, as insoluble iron compounds, during the subsequent oxygenation to regenerate ferric sulfate is pH sensitive, with increasing pH increasing the proportion of iron values separated as insoluble iron compounds. Accordingly, the pH is adjusted prior to the oxidation in order to facilitate separation of iron values in an amount corresponding to that which was leached from the ore.

The pregnant solution in line 18 is introduced into a ferric sulfate regeneration zone, schematically indicated as 19, wherein the ferrous sulfate is oxidized to ferric sulfate with molecular oxygen introduced, generally as air, through line 21. The oxidation reaction may be represented by the following equation:

$$2FeSO_4 + \tfrac{1}{2}O_2 + H_2SO_4 \rightarrow Fe_2(SO_4)_3 + H_2O$$

In addition, the generated ferric sulfate undergoes hydrolysis to insoluble iron compounds (ferric oxide and/or basic ferric sulfate) with the extent of such hydrolysis being pH sensitive as well as time and temperature dependent. The conditions in zone 19 are controlled in such a manner that essentially only that portion of the iron present in the pregnant solution which was derived from the ore is precipitated as insoluble iron compounds.

A liquid slurry comprised of soluble copper values, as copper sulfate, soluble ferric sulfate and insoluble iron compounds and perhaps some insoluble silver (derived from the catalyst) is withdrawn from zone 19 through line 22 and introduced into a settling zone 23 to separate solids therefrom which are withdrawn through line 24. The silver values may be recovered from the solids by a conventional technique, as hereinabove described and the recovered silver values recycled to the leaching.

A solid free leaching solution containing extracted copper values, as cupric sulfate and ferric sulfate, is withdrawn from settling zone 23 through line 25 and introduced into a copper recovery zone, of a type known in the art, schematically indicated as 26, to recover the soluble copper values from the leaching solution. Thus, for example, the copper recovery zone may include an extraction zone wherein the copper values are extracted from the leaching liquid by a suitable extraction solvent, such as hydroxy oxime extractant dissolved in kerosene, followed by stripping of the copper values from the extraction solvent, for example, with sulfuric acid from which the copper metal may be recovered by direct electrolysis, as described in U.S. Pat. No. 3,224,873.

The leaching solution, which may still contain some cupric sulfate, as hereinabove described, is withdrawn from copper recovery zone 26 through line 27, admixed with make-up sulfuric acid in line 28, if sulfuric acid is to be present during the leaching and recycled silver values in line 29, and then passed to the leaching zone through line 12.

A further embodiment of the present invention is illustrated in FIG. 2 of the drawings.

Referring now to FIG. 2 of the drawings, a finely divided (100%–150 mesh) copper bearing ore concentrate, such as chalcopyrite, in line 100 is introduced into a leaching zone 101 along with a leaching solution in line 102, comprised of a dilute aqueous sulfuric acid and a catalytic amount of silver, as hereinabove described. The leach solution may also include a buffer, such as ammonium sulfate, to control pH, and thereby minimize solubilization of iron values, as hereinabove described. Copper sulfide recycle, recovered from the tailings of the leach operation, as hereinafter described, may also be introduced into the leaching zone 101 through line 103. Air or oxygen is also introduced into the leaching zone 101 through line 104. The leaching zone, as known in the art, may be comprised of a battery of stirred vessels, including gas dispersion devices, arranged for a batch or continuous operation. The leaching zone is operated at the conditions hereinabove described, and as a result, copper values are extracted into the leaching solution, as sulfates, and byproduct elemental sulfur and iron values are in solid form.

An effluent slurry is withdrawn from leaching zone 101 through line 105 and introduced into a liquid-solid separation zone, of a type known in the art, schematically indicated as 106 to separate solid materials which are withdrawn through line 107.

The pregnant solution of copper sulfate is withdrawn from zone 106 through line 108 and introduced into copper recovery zone 109 wherein copper metal is recovered electrolytically as known in the art. The spent electrolyte, which contain regenerated sulfuric acid in an amount equivalent to the recovered elemental copper is withdrawn from the copper recovery zone 109 and employed as the leach liquor in line 102. Make-up catalyst and/or recovered silver values are added to the leach liquor through line 112.

The solids withdrawn from zone 106 through line 107 generally include recoverable copper values and, accordingly, the solids in line 107 are generally introduced into a recovery zone 111 to recover such copper values, as copper sulfide, from the tailings. The recovery zone 111 may be of a type known in the art wherein copper sulfides and sulfur are separated from hydrated ferric oxide and gangue material. For example, copper sulfide and sulfur may be recovered by flotation to produce a concentrate rich in sulfur and copper sulfide. The solids recovered in zone 111 may also include precipitated silver values which can be recovered and recycled to the leaching. The concentrate may then be heated under pressure and hot filtered with a jacketed pressure filter to produce a copper sulfide rich filter cake, and a filtrate, which is either discarded or further treated to recover sulfur.

The copper sulfide rich filter cake, prior to recycle to the leaching zone, is treated to recover any precipitated silver values derived from the silver catalyst by a conventional technique, as hereinabove described and the copper sulfide rich solids, in line 103, are recycled to the leaching zone.

The hereinabove described embodiments are merely illustrative of the present invention, and the use of other embodiments for oxidatively leaching copper values from a copper containing ore by the use of silver, as a catalyst, are deemed to be within the scope of those skilled in the art from the present teachings. Thus, for example, the copper bearing ore may be oxidatively leached by the use of concentrated sulfuric acid. Similarly, the oxidative leaching with ferric sulfate may be effected in the presence of added oxygen. These modifications and others should be apparent to those skilled in the art.

The invention will be further described with respect to the following examples which further illustrate the present invention. It is to be understood, however, that the scope of the invention is not to be limited thereby.

EXAMPLE 1

A leach liquor consisting of 600 gm of ferric sulfate hydrate (21%Fe), 700 gms of water, 20 ml of concentrated sulfuric acid, and 1.5 gms of silver nitrate was prepared and preheated in a 2,000 ml. beaker. This leach liquor was charged to a 1,500 ml stirred, dimpled, preheated glass resin flask, and 130 gms of a dry ball milled chalcopyrite ore concentrate (31.6% Fe, 18.2% Cu and 32.0%S) was added. Flask contents were leached for 90 minutes at 195°±5°F., and atmospheric pressure. The contents of the flask were hot filtered on a heated Buchner funnel and the damp filter cake washed with 200 ml. of hot water. A liquid composite, weighing 1,510 gms, was prepared by combining the filtrate or pregnant solution and the washes in a jar. A chemical analysis run on the composite liquor established its iron and copper content, which were 9.93 wt.% and 1.38 wt.% respectively. These analytical figures correspond to a 71% iron extraction and an 88% copper extraction.

EXAMPLE 2

A leach liquor consisting of 600 gms of ferric sulfate hydrate (21% Fe), 700 gms of water, 20 ml of concentrated sulfuric acid, and 0.10 gms of silver nitrate was prepared and preheated in a 2,000 ml beaker. The contents of the beaker were charged to a 1,500 ml stirred, dimpled preheated glass resin flask. One hundred thirty grams of a dry ball milled chalcopyrite ore concentrate (31.6% Fe, 18.2% Cu and 32.0% S) were added and the admix was leached for 75 minutes at 195°±5°F and atmospheric pressure. The contents of the resin flask were hot filtered on a heated Buchner funnel and the filter cake was washed with 200 ml of hot water. Filtrate and wash were combined into a composite, weighing 1,507 gms, which was analyzed for iron and copper content. The iron and copper content of the composite was found to be 10.1 wt.% and 1.21 wt.% respectively. These figures correspond to a 73% iron extraction and a 76% copper extraction.

EXAMPLE 3

This example illustrates leaching without the use of a catalytic amount of silver ions.

A leach liquor consisting of 600 gms of ferric sulfate hydrate (21% Fe), 700 gms of water and 20 ml of concentrated sulfuric acid were premixed and preheated in a 2000 ml beaker. This leach liquor plus 130 gms of a dry ball milled chalcopyrite concentrate (31.6% Fe, 18.2% Cu and 32% S) was added to a 1,500 ml stirred, dimpled and preheated resin flask. The contents of the resin flask were leached for 150 minutes at 195°±5°F. and at atmospheric pressure. Flask contents were then hot filtered on a heated Buchner funnel and the damp filter cake was washed with 300 ml of hot water. A liquid composite, weight 1,515 gms., was prepared by combining the filtrate and spent washes in a jar. The iron and copper content of the composite was found to be 9.38 wt. % and 0.58 wt. %, respectively. These analytical data corresponds to an iron extraction of about 50% and a copper extraction of 33%. The copper recovery is significantly less than that obtained in Examples 1 and 2, notwithstanding the fact that the leaching time is significantly longer.

EXAMPLE 4

The experimental work in this example was carried out in a 1-liter Autoclave Engineers stainless steel autoclave. Mixing was provided by a Dispersimax turbine mounted on a hollow shaft plus a top downward pumping propeller agitator mounted on the same shaft and housed in a draft tube. This mixing configuration was chosen to provide good contacting between a gas, liquid and solid phase, and in addition to suppress an ore flotation tendency.

A leach liquor consisting of 56 gms. of ammonium sulfate, 20 ml of concentrated sulfuric acid, 500 gms of water, and 0.06 gms of silver nitrate was prepared and preheated in a 1-liter beaker. This leach liquor was charged to the preheated autoclave, and 100 gms of dry ball milled chalcopyrite concentrate (31.5% Fe, 18.2% Cu, and 32% S) plus 1 drop of antifoam was added to the autoclave. The autoclave was sealed, the stirrer adjusted to 1,800 RPM, and the temperature adjusted to 230°±5°F. An oxygen pad of 100 psi was placed on the autoclave, and the contents of the autoclave were leached for 4½ hours at 230°±5°F. under a 100 psi oxygen pad. At the end of the 4½ hour leach period, a sample weighing 18.6 gms was withdrawn from the autoclave and diluted with 9.3 gms of water. The diluted sample was filtered and the filtrate analyzed for copper and iron content. The copper and iron content of the diluted, filtered sample was found to be 1.32 wt. % and 0.10 wt. % respectively. These figures correspond to 2.10 wt. % copper and 0.16 wt. % iron on a pregnant liquor basis, and represents a 68.3% copper extraction.

EXAMPLE 5

The experimental work in this example was done in a 1-liter Autoclave Engineers stainless steel autoclave. Mixing was provided by an agitation configuration identical to the one described in Experiment 4.

A leach liquor consisting of 56 gms of ammonium sulfate, 20 ml of concentrated sulfuric acid, and 500 gms of water was prepared and preheated in a 1-liter beaker. This leach liquor was charged to the preheated autoclave, and then 100 gms of dry ball milled chalcopyrite ore concentrate (31.6% Fe, 18.2% Cu and 32% S) plus 1 drop of anti-foam were added to the autoclave. The autoclave was sealed, the stirrer adjusted to 1800 RPM, and then the temperature was adjusted to 230°±5°F. An oxygen pad of 100 psi was placed on the autoclave, and the contents of the autoclave were leached for 4½ hours at 230°±5°F under a 100 psi oxygen pad. At the end of the 4½ hour leach cycle, a sample weighing 24.9 gms was withdrawn from the autoclave and diluted with 12.4 gms of water. The diluted sample was filtered and the copper and iron content of the filtered sample was determined. The diluted filtered sample was found to contain 1.21 wt. % copper and 0.02 wt. % iron. These figures translate to 1.92 wt. % copper and 0.03 wt.% iron on a leach liquor basis. The observed copper extraction was 61.2%.

EXAMPLE 6

A leach liquor consisting of 650 gms of ferric sulfate hydrate (20.5%Fe) 650 gms of water, and 22 ml of concentrated sulfuric acid was prepared and preheated in a 2,000 ml beaker. The contents of the beaker were charged to 1,500 ml. stirred, dimpled, glass resin flask. Flask temperature was adjusted to 195°±5°F., 75 gms of reagent grade cuprous sulfide powder (100%−200 mesh) was added, and the mixture was leached for 3 hours and 15 minutes at 195°±5°F, and atmospheric pressure. At the end of the 3 hour and 15 minute leach period the contents of the resin flask were hot filtered on a heated Buchner funnel. The tailings cake was then washed with 2–50 ml. portions of hot water and the washed damp cake, weighing 57 gms was analyzed for copper content. Copper content of the tailings cake was found to be 5.82% which corresponds to a 94.5% copper extraction.

EXAMPLE 7

A leach liquor consisting of 650 gms of ferric sulfate hydrate (20.6% Fe), 649.5 gms of water, 22 ml. of concentrated sulfuric acid, and 0.35 gms of silver sulfate was prepared in a beaker. After preheating, the beaker's contents were charged to a 1,500 ml stirred, dimpled glass resin flask. Flask contents were heated to 195°±5°F and 75 gms of reagent grade cuprous sulfide powder (100%−200 mesh) was added to the flask. The admixture in the flask was leached for 1 hour at 195°±5°F and atmospheric pressure. At the end of the 1 hour leach period the contents of the resin flask were hot filtered on a heated Buchner funnel. The tailings cake was washed with 2-50 ml. portions of hot water. Fifty six gms. of damp tailings cake were recovered and analyzed for copper content. Copper content of the damp tailings cake was found to be 0.47 wt. % which corresponds to a 99.6% copper extraction.

EXAMPLE 8

A leach liquor consisting of 1,000 ml. of concentrated sulfuric acid and 0.70 gms of silver oxide ($Ag_2O$) was made up in a stirred, dimpled glass resin flask. The leach liquor was heated to 195°±5°F. and 100 gms of reagent grade cuprous sulfide powder (100%—200 mesh) was added. Flask contents were leached at 195°±5°F and atmospheric pressure for 4 hours. At the end of the 4 hour leach period the flask's contents were hot filtered on a heated Buchner funnel and the filter cake was washed with 2-50 ml. portions of concentrated sulfuric acid. The sulfuric acid wet cake was then charged to a 1,500 ml. agitated resin flask containing 1,000 ml. of water at 190°±5°F. After 1 hour of contacting the admixture in the flask was hot filtered and the filter cake was washed with 2-50 ml. portions of hot water. Approximately 35 gms. of damp cake was recovered. The copper content of the damp cake was 22.7 wt. %, which is equivalent to a 90% copper extraction.

EXAMPLE 9

One thousand ml. of concentrated sulfuric acid were charged to a 1,500 ml. stirred, dimpled glass resin flask and heated to 195°±5°F. One hundred gms of reagent grade cuprous sulfide powder (100%—200 mesh) were added to the flask and leached for 4 hours at 195°±5°F and atmospheric pressure. At the end of the 4 hour leach period the flask's contents were hot filtered on a heated Buchner funnel and the filter cake was washed with 2-50 ml. portions of warm concentrated sulfuric acid. The sulfuric acid wet filter cake was then charged to an agitated resin flask containing 1,000 ml. of water at 190°±5°F. After 1 hour of contacting the mixture in the resin, flask was hot filtered and filter cake was washed with 2-50 ml. portions of hot water. The damp cake, weighing 50 grams, was found to contain 40.0 wt. % copper. This residual copper content is equivalent to a 75.0% copper extraction.

EXAMPLE 10

A leach liquor consiting of 300 gms of ferric sulfate hydrate (20.5% Fe) 350 gms of water, and 65 ml. of concentrated sulfuric acid was prepared and preheated to 150°-170°F in a 1,000 ml beaker. The contents of the beaker were charged to a standard 1,000 ml. Autoclave Engineers autoclave outfitted with a Dispersimax agitator. Seventy gms of a chalcopyrite ore concentrate assaying 19% copper was charged and the autoclave was sealed up. A 50 psi $O_2$ pad was placed on the autoclave and the temperature was quickly raised to 195°±5°F. The autoclave's contents were held at 195°±5°F and subjected to a 50 psi $O_2$ partial pressure for a time period of 2½ hours. At the conclusion of the leach period, the contents of the autoclave were quickly cooled to 120°-130°F and the system was vented down to atmospheric pressure. Pregnant leach liquor from the autoclave was then hot filtered on a heated Buchner funnel and the damp tailings cake was washed with 2-100 ml portions of hot water.

Sixty grams of damp spent tailings cake were recovered from the Buchner funnel. The damp tailings cake contained 12.1 wt. % copper, on an as is basis, which corresponds to a 45.4% copper extraction.

EXAMPLE 11

A leach liquor consisting of 300 gms of ferric sulfate hydrate (20.5% Fe), 350 gms of water, 65 ml. of concentrated sulfuric acid, and 0.050 gms of silver as silver sulfate ($Ag_2SO_4$) was prepared and preheated in a 1,000 ml. beaker. This leach liquor was then charged to a preheated standard 1,000 ml. Autoclave Engineers autoclave outfitted with a Dispersimax agitator. Seventy gms. of a chalcopyrite ore concentrate assaying 19% copper was charged and the autoclave was sealed up. A 50 psi $O_2$ pad was placed on the autoclave and the temperature was quickly raised to 195°±5°F. The autoclave's contents were held at 195°±5°F and subjected to a 50 psi $O_2$ partial pressure for a time period of 2½ hours. At the conclusion of the leach period, the contents of the autoclave were quickly cooled to 120°-130°F and the system was vented down to atmospheric pressure. Pregnant leach liquor from the autoclave was then hot filtered on a heated Buchner funnel and the damp tailings cake was washed with 2-100 ml. portions of hot water.

Fifty three gms of washed damp tailings cake containing 0.70 wt. % copper on an as is basis were recovered from the funnel. This residual copper content corresponds to a 97.2% copper extraction.

The present invention is particularly advantageous in that by the use of a silver containing catalyst the oxidative leaching of copper ores is substantially improved as evidenced by shorter leach times and/or improved copper extraction.

Numerous modifications and variations of the present invention are possible in light of the above teachings and therefore, within the scope of the appended claims the invention may be practised other than as particularly described.

What is claimed is:

1. In a process for the oxidative leaching of copper ores with a leaching solution comprising a member selected from the group consisting of aqueous ferric sulfate, an aqueous mixture of ferric sulfate and sulfuric acid, aqueous sulfuric acid and concentrated sulfuric acid, said oxidative leaching being effected in the presence of molecular oxygen when said member is aqueous sulfuric acid, the improvement comprising:

effecting said leaching in the presence of a catalytic amount of silver, said catalytic amount of silver being at least 25 ppm initially dissolved in said leaching solution.

2. The process of claim 1 wherein said silver is initially dissolved in said leaching solution in an amount from about 25 to about 10,000 ppm, measured as elemental silver.

3. The process of claim 1 wherein said silver is initially dissolved in said leaching solution in an amount from about 50 to about 500 ppm, measured as elemental silver.

4. The process of claim 2 wherein said ore is a complex mineral sulfide ore containing copper and iron.

5. The process of claim 2 wherein said leaching solution is an aqueous solution containing at least 90%, by weight, sulfuric acid.

6. The process of claim 5 wherein said leaching is effected at a temperature from about 150°F to about 235°F.

7. The process of claim 1 wherein said member is aqueous sulfuric acid.

8. The process of claim 7 wherein said leaching is effected at a temperature from about 150°F to about 235°F.

9. The process of claim 8 wherein said sulfuric acid is present in the leach solution in an amount from about 0.5% to about 5.0%, by weight.

10. A process for oxidatively leaching a copper ore, comprising:
    leaching said copper ore with a leaching solution containing aqueous ferric sulfate and a catalytic amount of silver of at least 25 ppm initially dissolved in the leaching solution.

11. The process of claim 10 wherein said silver is initially dissolved in said leaching solution in an amount from about 25 to about 10,000 ppm, measured as elemental silver.

12. The process of claim 11 wherein said ferric sulfate is present in the leach solution in an amount from about 2 to about 40%, by weight.

13. The process of claim 11 wherein said ferric sulfate is present in an amount from about 10 to about 40%, by weight.

14. The process of claim 12 wherein said leach solution further comprises sulfuric acid in an amount from about 0 to about 20%, by weight.

15. The process of claim 12 wherein said leach solution further comprises sulfuric acid in an amount from about 1 to about 5%, by weight.

16. The process of claim 14 wherein said leaching is effected at a temperature from about 150°F to about 235°F.

17. The process of claim 14 wherein said leaching is effected at a temperature from about 180°F to about 225°F.

18. A process for oxidatively leaching a copper ore, comprising:
    leaching said copper ore with an aqueous leaching solution comprising from about 2 to about 40%, by weight, of ferric sulfate and from about 0 to about 20%, by weight, sulfuric acid, said leaching solution having initially dissolved therein from about 25 to about 10,000 ppm of silver, measured as elemental silver, said leaching being effected at a temperature from about 150°F to about 235°F. to produce a pregnant leach solution containing copper values from the ore dissolved in the leaching solution as cupric sulfate.

19. The process of claim 18 wherein said copper ore is a complex mineral sulfide ore containing copper and iron.

20. The process of claim 19 wherein said leaching solution comprises from about 1 to about 5%, by weight, sulfuric acid.

21. The process of claim 20 and further comprising:
    removing solids from said pregnant leach solution;
    contacting said pregnant leach solution with molecular oxygen to precipitate iron values dissolved from the ore and regenerate ferric sulfate; recovering copper values from the leach solution; and recycling the leach solution to said leaching.

22. The process of claim 14 wherein said leaching is effected in the presence of molecular oxygen.

* * * * *